(12) United States Patent
Kuhns (10) Patent No.: US 10,070,589 B1
(45) Date of Patent: Sep. 11, 2018

(54) BALE TRAILER (71) Applicant: Abraham B. Kuhns, Arthur, IL (US)

(72) Inventor: Abraham B. Kuhns, Arthur, IL (US)

(*) Notice: Subject to any disclaimer, the term of this patent is extended or adjusted under 35 U.S.C. 154(b) by 0 days.

(21) Appl. No.: 15/724,138

(22) Filed: Oct. 3, 2017

Related U.S. Application Data (60) Provisional application No. 62/403,739, filed on Oct. 4, 2016.

(51) Int. Cl.
A01D 90/10 (2006.01)

(52) U.S. Cl.
CPC .................... A01D 90/10 (2013.01)

(58) Field of Classification Search
CPC .... A01D 90/083; A01D 90/10; A01D 90/105; B60P 1/24; B60P 1/045; B60P 1/486; B60P 1/438
See application file for complete search history.

(56) References Cited

U.S. PATENT DOCUMENTS

| | | | |
|---|---|---|---|
| 2,752,054 A * | 6/1956 | Thompson | B62B 3/104 414/621 |
| 4,044,906 A | 8/1977 | Schrag et al. | |
| 4,390,312 A | 6/1983 | Skeem | |
| 4,580,843 A * | 4/1986 | Lund | A01D 90/083 105/239 |
| 4,909,694 A | 3/1990 | Peters et al. | |
| 4,930,958 A | 6/1990 | Palmer | |
| 4,938,646 A | 7/1990 | Elias et al. | |
| 5,018,924 A | 5/1991 | Palmer | |
| 5,062,757 A | 11/1991 | Eichenauer | |
| 5,180,271 A * | 1/1993 | Farden | A01D 90/083 298/18 |
| 5,249,903 A | 10/1993 | Green et al. | |
| 5,340,259 A | 8/1994 | Flaskey | |
| 5,676,513 A | 10/1997 | Bingham | |
| 6,068,434 A * | 5/2000 | Vankooten | A01D 90/083 298/18 |
| 6,152,536 A | 11/2000 | Krinhop | |
| 6,840,729 B2 | 1/2005 | Haukaas | |
| 6,935,827 B2 | 8/2005 | Delaurier | |
| 2010/0266370 A1 * | 10/2010 | Munro | A01D 90/083 414/24.5 |
| 2015/0334921 A1 * | 11/2015 | Jahraus | A01D 90/08 410/47 |

OTHER PUBLICATIONS

Pride Of The Prairie bale trailer. Cliff's Welding Service, Inc., Phillipsburg, Kansas 67661. Retrieved from Internet URL: www.cliffsweldinginc.com on Aug. 17, 2017.

Atchison hay trailer. B-G Industries, Wakeeney, Kansas 67672. Retrieved from Internet URL: www.b-gindustries.com on Aug. 17, 2017.

Pyramid bale trailer. Pyramid Trailer, Stockton, Kansas 67669. Retrieved from Internet URL: www.pyramidbaletrailers.com on Aug. 17, 2017.

* cited by examiner

Primary Examiner — Glenn F Myers
(74) Attorney, Agent, or Firm — Philip L. Bateman (57) ABSTRACT

A bale trailer has two parallel bale cradles that are adjustable to accommodate different shapes and sizes of bales. Each cradle is balanced toward an unloading position and each is automatically returned to the carry position after unloading by the action of a spring.

5 Claims, 10 Drawing Sheets

BALE TRAILER

CROSS-REFERENCE TO RELATED APPLICATION

This application claims the benefit of U.S. Provisional Application Ser. No. 62/403,739, Oct. 4, 2016.

FIELD OF THE INVENTION

This invention relates to material handling. More particularly, this invention relates to the transport of bales of material such as hay and straw.

BACKGROUND OF THE INVENTION

Hay, straw, and other plant materials are commonly formed into bales after being cut. Hay is a grass, legume (e.g., alfalfa or clover), or other plant that is used as animal feed. Straw is the dry stalks of cereal plants after the grain and chaff have been removed that is used as animal feed and bedding. For many years, bales have been formed into the geometrical shape of a square prism (also known as a cuboid) in a size that can be handled manually. These bales are commonly known as "square" bales because they have square ends. In more recent years, square bales in larger sizes have become more common. In addition, bales in the geometrical shape of a cylinder have become more common. These bales are commonly known as "round" bales because they have round ends. Round bales are commonly made in several different sizes.

Bales of hay and straw deteriorate if left uncovered in the field. Accordingly, it is common practice to transport the bales from the field to a barn or other enclosure. A variety of trailers have been disclosed for transporting bales. For example, bale trailers are disclosed in Schrag et al., U.S. Pat. No. 4,044,906, Aug. 30, 1977; Skeem, U.S. Pat. No. 4,390,312, Jun. 28, 1983; Peters et al., U.S. Pat. No. 4,909,694, Mar. 20, 1990; Palmer, U.S. Pat. No. 4,930,958, Jun. 5, 1990; Elias et al., U.S. Pat. No. 4,938,646, Jul. 3, 1990; Palmer, U.S. Pat. No. 5,018,924, May 28, 1991; Eichenauer, U.S. Pat. No. 5,062,757, Nov. 5, 1991; Green et al., U.S. Pat. No. 5,249,903, Oct. 5, 1993; Flaskey, U.S. Pat. No. 5,340,259, Aug. 23, 1994; Bingham, U.S. Pat. No. 5,676,513, Oct. 14, 1997; Krinhop, U.S. Pat. No. 6,152,536, Nov. 28, 2000; Haukaas, U.S. Pat. No. 6,840,729, Jan. 11, 2005; and Delaurier, U.S. Pat. No. 6,935,827, Aug. 30, 2005.

Another bale trailer is the PRIDE OF THE PRAIRIE bale trailer manufactured and sold by Cliff's Welding Service, Inc. of Phillipsburg, Kans. This bale trailer has two parallel cradles for holding round bales. When released, the cradles pivot and the bales are unloaded to either side of the trailer. The trailers is not adjustable for different sizes and shapes of bales and the cradles does not automatically return to the carry position after unloading. Other bale trailers include the ATCHISON hay trailer manufactured and sold by B-G Industries of Wakeeney, Kans. and the PYRAMID bale trailer manufactured and sold by Pyramid Trailer of Stockton, Kans.

Although these trailers have many useful features, there is a demand for a bale trailer that is adjustable for different sizes and shapes of bales and whose cradles automatically return to their carry position after unloading.

SUMMARY OF THE INVENTION

The general object of this invention is to provide an improved bale trailer. A more particular object is to provide a bale trailer that is adjustable for different sizes and shapes of bales and whose cradles automatically return to their carry position after unloading.

I have invented an improved bale trailer for transporting bales. The bale trailer comprises: (a) a frame having a length, a longitudinal axis, and a hitch; (b) a plurality of wheels supporting the frame; and (c) a pair of longitudinal and parallel bale cradles, one cradle on each side of the longitudinal axis of the frame, each cradle having a carry position and an unloading position, each cradle being balanced toward the unloading position, each cradle being retained in the carry position by a latch, and each cradle being returned to the carry position after unloading by spring action. Each cradle comprises: (i) a plurality of transverse members supported by the frame, the transverse members having movable fulcrum brackets connected on the upper surface near the outward ends thereof, each fulcrum bracket being connected to a rotatable threaded rod within the transverse member such that the distance between the fulcrum bracket and the outward end of the transverse member is adjustable; (ii) a pair of spaced apart levers for each transverse member, each lever having a fixed fulcrum bracket and being pivotably connected to the movable fulcrum bracket on the transverse member; (iii) a pair of spaced apart movable bar brackets on the upper surface of each lever, each pair of bar brackets being connected to a rotatable threaded rod within the lever such that the distance between the pair of bar brackets on each lever is adjustable; and (iv) two parallel and spaced apart bale support bars connected to the bar brackets running substantially the entire length of the frame for supporting bales.

The bale trailer of this invention is adjustable for different sizes and shapes of bales. Its cradles automatically return to their carry position after unloading.

DETAILED DESCRIPTION OF THE INVENTION

1. The Invention in General

Figure 1:
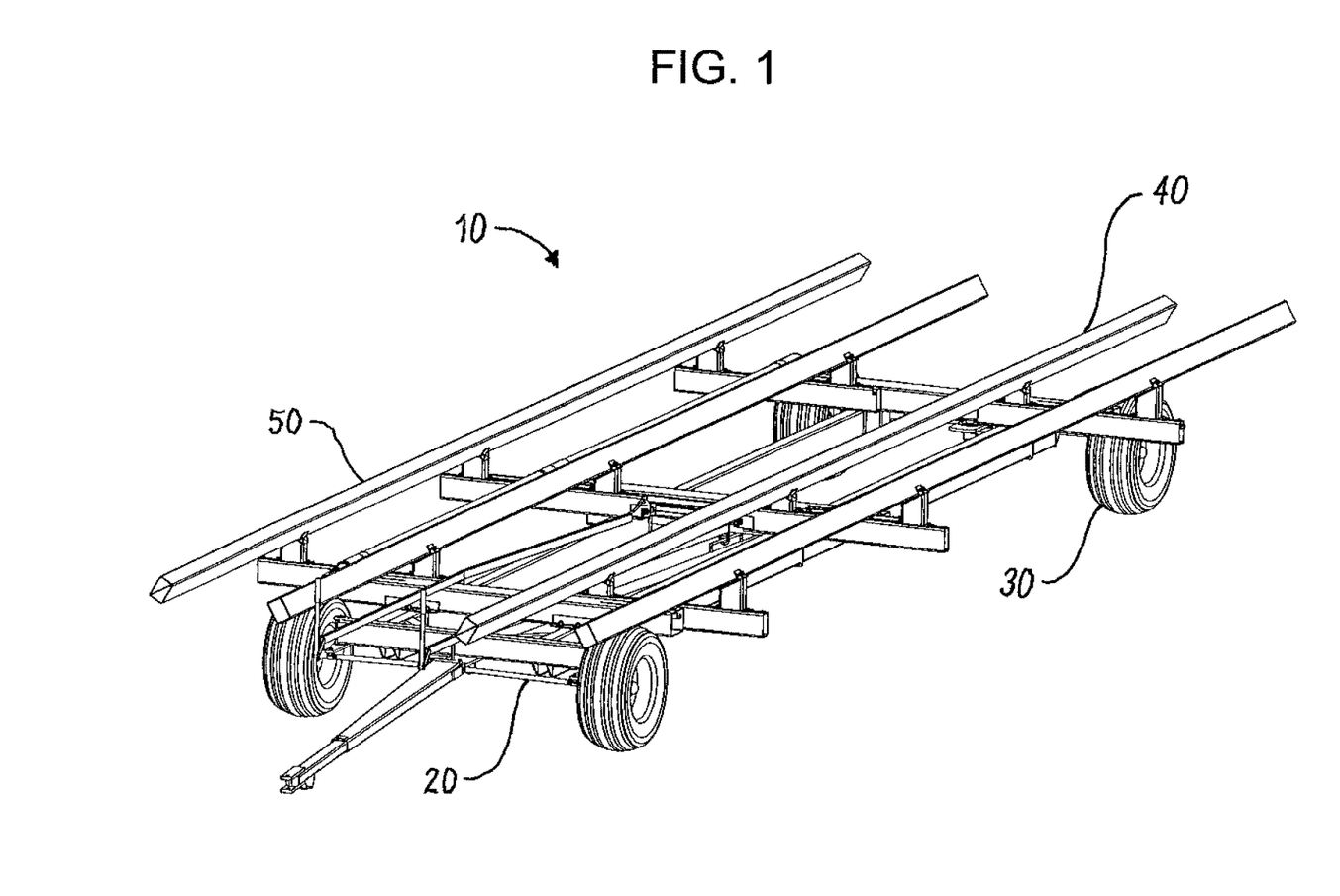
FIG. 1 is a front perspective view of a preferred embodiment of the bale trailer of this invention.
Figure 2:
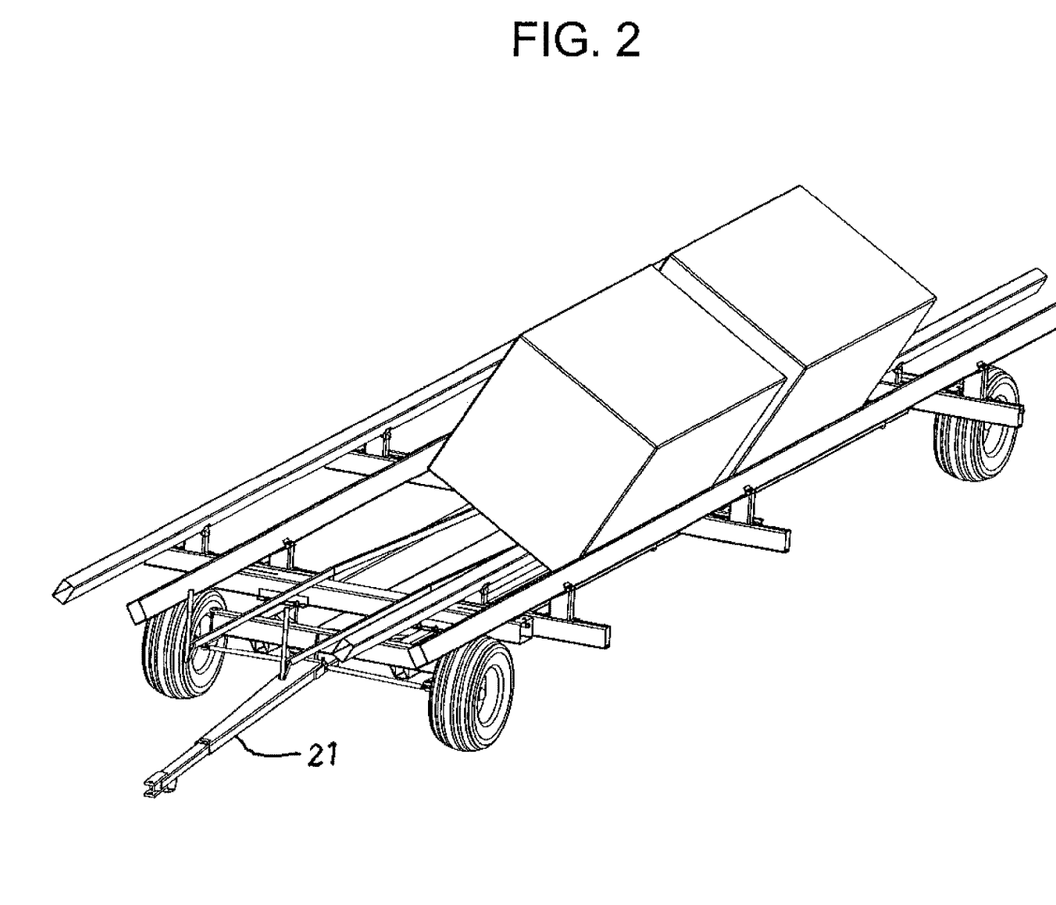
FIG. 2 is a perspective view thereof carrying two square bales.
Figure 3:
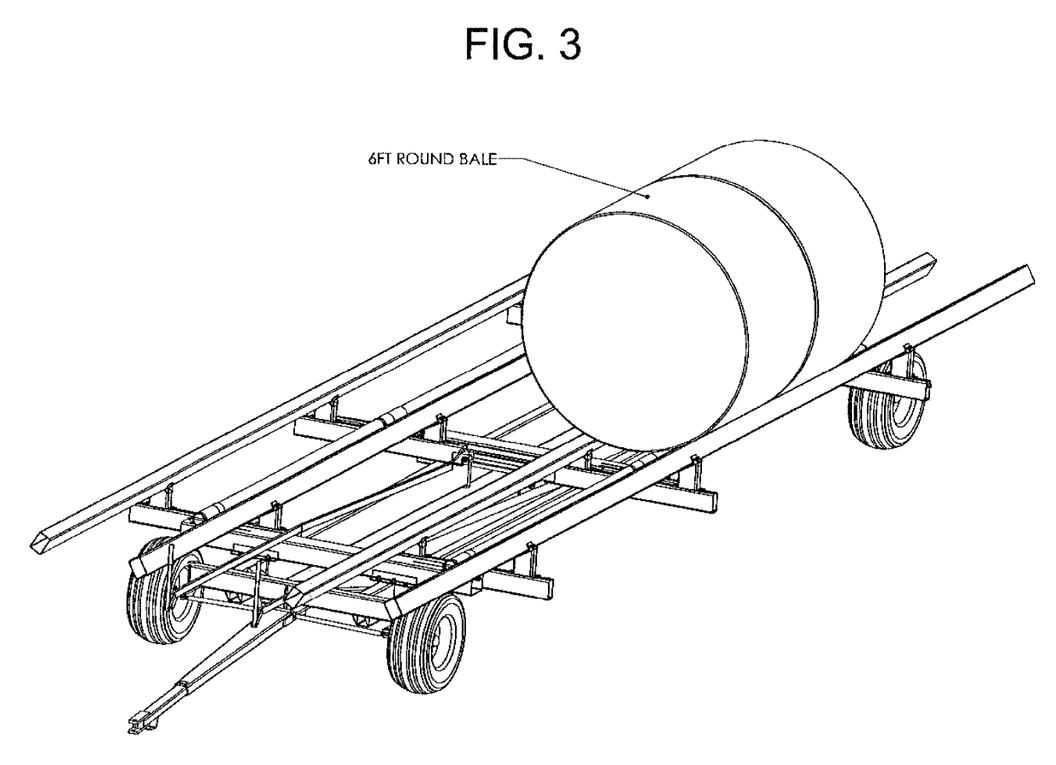
FIG. 3 is a perspective view thereof carrying a round bale.
Figure 4:
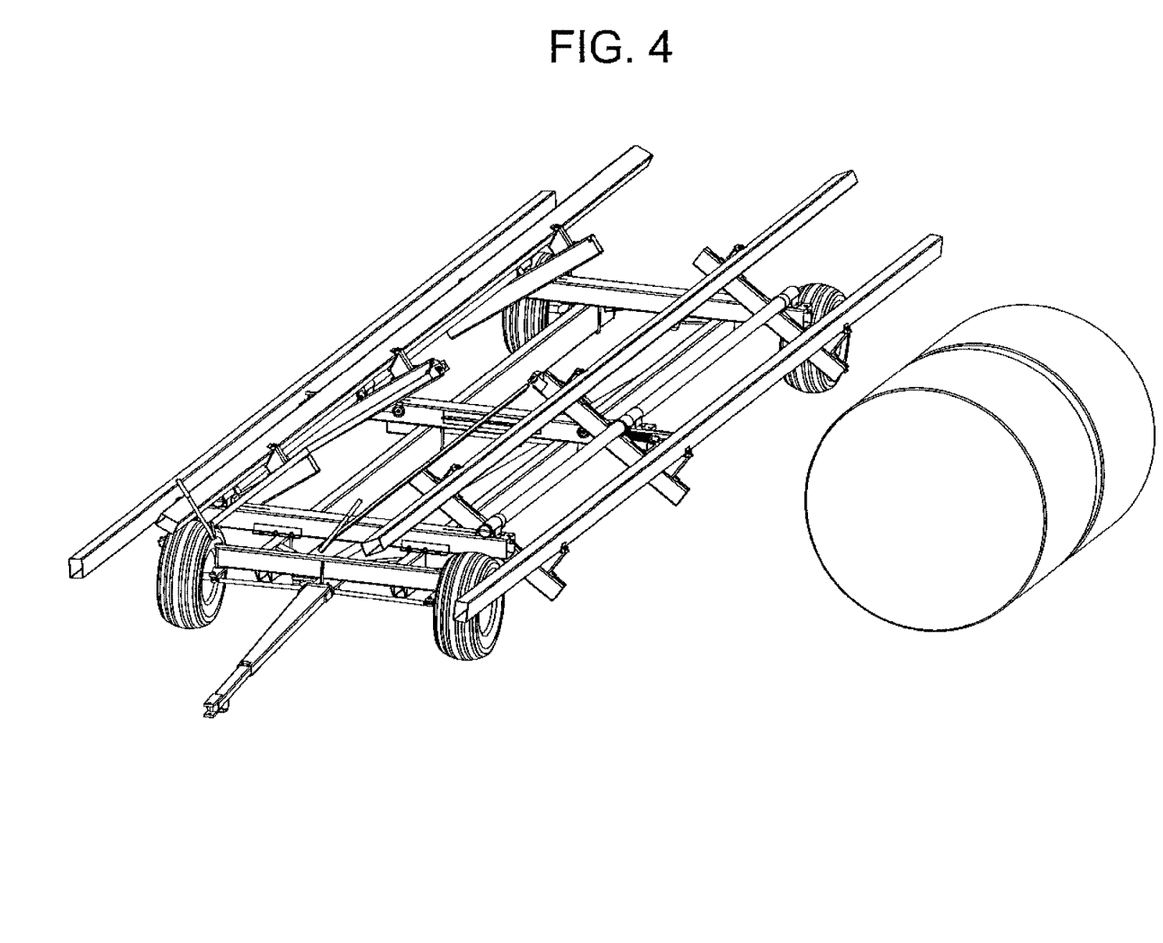
FIG. 4 is a perspective view thereof unloading a round bale.

This invention is best understood by reference to the drawings. Referring first to FIG. 1, a preferred embodiment of the bale trailer 10 of this invention comprises a frame 20, a plurality of wheels 30, a left (port side in a boat analogy) bale cradle 40, and a right (starboard side) bale cradle 50. The left and right bale cradles are mirror images. The bale trailer can carry square bales, as illustrated in FIG. 2, and can carry round bales, as illustrated in FIG. 3. Bales are unloaded to the side (laterally) as illustrated in FIG. 4.

Each cradle has a generally horizontal carry position. The carry position is also known as the loading position. When a bale is loaded onto the cradle, a latch holds the cradle in the carry position. When the latch is released, the cradle tips to the outer side to unload the bale(s). The cradle then automatically returns to the carry position and latches. The bale trailer is described in more detail below.

2. The Frame and Wheels

The frame and wheels of the bale trailer are conventional. The frame is generally a rectangular structure made primarily of steel tubing. The frame includes a hitch 21 for attachment to a towing vehicle. The hitch is generally of the all wheel steer or gooseneck type. An all wheel steer frame is illustrated in FIGS. 1 to 5. While all steer frames have two axles, other types of frames may contain two, three, or more axles. If desired, the frame includes suspension elements such as springs or shock absorbers. The wheels generally consist of a metal wheel with a tubeless rubber tire. In the preferred embodiment, the frame and wheels are separable from the cradles. The cradles are attached to the frame by U-bolts 22 shown in FIGS. 7 and 8.

3. The Cradles

The cradles hold the bales. As previously mentioned, the left and right cradles are mirror images. Only the right (starboard) side cradle is described for brevity. Referring now to FIGS. 5 to 8, the right cradle contains two bale support bars 51 that generally run about the length of the frame. The term "about" is used herein to mean plus or minus 25 percent of the measurement or other quantified property referenced. The bars preferably run a little longer than the length of the frame so there is a little overhang in front and in back. In the preferred embodiment, the bale support bars extend a few feet in front and behind the frame. The support bars support the bales, i.e., the bales rest directly upon the support bars.

Attached to the frame are a plurality of fixed transverse members 52, each of which has two movable fulcrum brackets 53, one near the outer end on each side. In the preferred embodiment, there are three fixed transverse members, one in the front, one in the middle, and one in the rear. As previously mentioned, the transverse members are attached to the frame with U-bolts.

Figure 7:
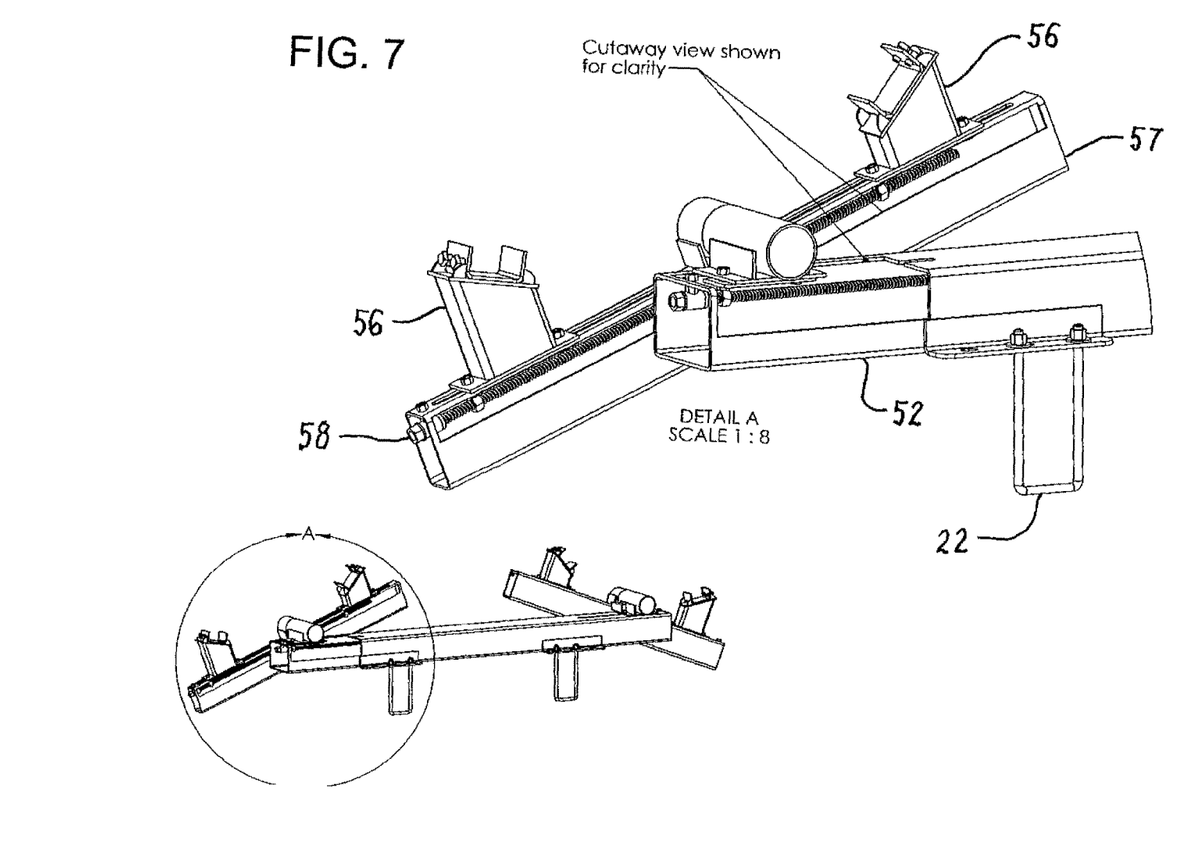
FIG. 7 is a perspective view showing one lever thereof.
Figure 8:
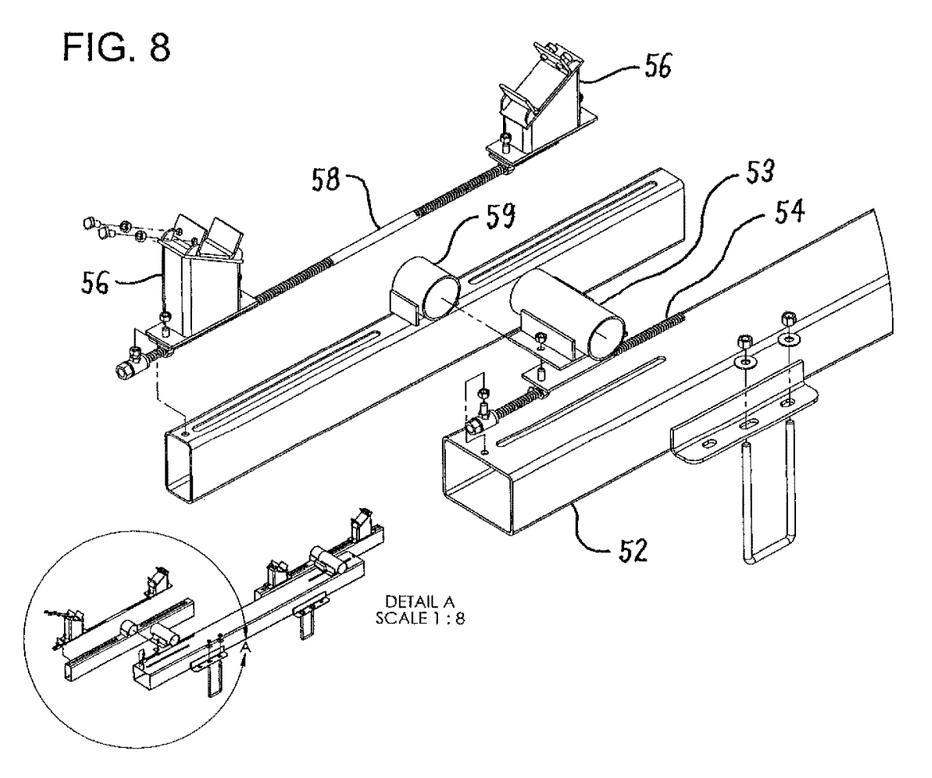
FIG. 8 is a perspective exploded view thereof.

In FIGS. 7 and 8, the movable fulcrum bracket near the outer end of the right side of the front transverse member is shown as viewed from the front of the trailer. Each movable fulcrum bracket is connected to a threaded rod 54 that runs inside the transverse member. It can be appreciated that rotation of the threaded rod in one direction causes the fulcrum bracket to move outwardly (closer to the end) and rotation in the other direction causes the fulcrum bracket to move inwardly (farther away from the end). In the preferred embodiment, the fulcrum bracket on each transverse member is a cylindrical tube. A connecting rod 55 passes through each fulcrum bracket on the side of the frame.

The adjustability of the position of the fulcrum brackets on the transverse members enables the position of the cradles to be varied to accommodate bales of varying size. For example, the largest round bales in common use are about six feet in diameter. When carrying these bales, the fulcrum brackets are set at their widest positions (closest to the ends of the fixed transverse members). Some jurisdictions do not allow trailers of such width to travel on public roads. Accordingly, it is desirable to have the flexibility of reducing the width of the trailer when required or convenient.

The bale support bars 51 are connected to two, three, or more pairs of bar brackets 56. The number of bar bracket pairs corresponds with the number of transverse members. Each pair of bar brackets ride along the upper surface of a pivoting arm lever 57. Only one pair of bar brackets is described for brevity. Both bar brackets of the pair are connected to a threaded rod 58 that runs inside the lever. The outer bar bracket is connected to a portion of the threaded rod that has right hand threads while the inner bar bracket is connected to a portion of the threaded rod that has left hand threads. It can be appreciated that rotation of the threaded rod in one direction causes the two brackets to move closer together and rotation in the other direction causes the two brackets to move farther apart. This adjustability enables the cradles to hold bales of various types and sizes. As can be seen in FIG. 7, the outer bracket is preferably taller than the inner bracket. The difference in height between the outer and inner brackets reduces the possibility of a bale falling off to the side when not desired, such as when traveling on a sloped surface or when cornering.

Figure 9:
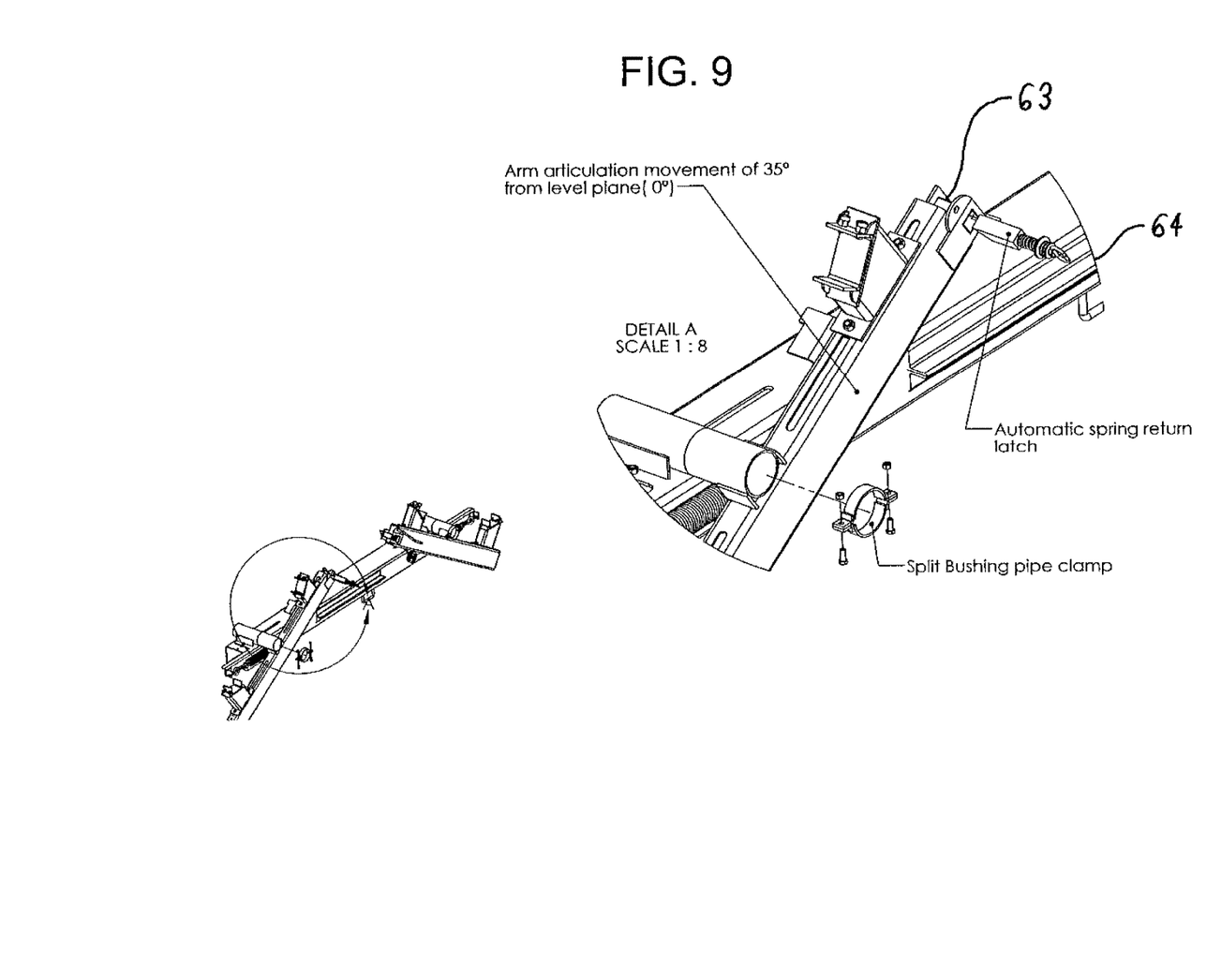
FIG. 9 is a detail front perspective view of the latching mechanism thereof.

The bar brackets straddle a fixed fulcrum bracket 59 that is attached to the upper surface of the pivoting arm lever. The fixed fulcrum bracket is preferably slightly offset so the cradle is balanced toward the unloading position when unloaded. In other words, the fixed fulcrum bracket is preferably slightly closer to the inner bar bracket than to the outer bar bracket so that the mass of the lever outward of the fixed fulcrum bracket is slightly greater than the mass of the lever inward. The balance toward the unloading position increases as the cradle is loaded. The balance toward the unloading position can be achieved or augmented in other ways as well, e.g., by increasing the weight of the outer bar brackets or bale support bars. In the preferred embodiment, the fixed fulcrum bracket is a cylindrical tube, similar in structure to the movable fulcrum bracket on the mating transverse member. The same connecting rod that passes through the movable fulcrum brackets on the transverse members also passes through the fixed fulcrum brackets on the levers. The connecting rod is preferably fixed in position with split bushing pipe clamps on its ends as seen in FIG. 9.

Figures 5, 6:
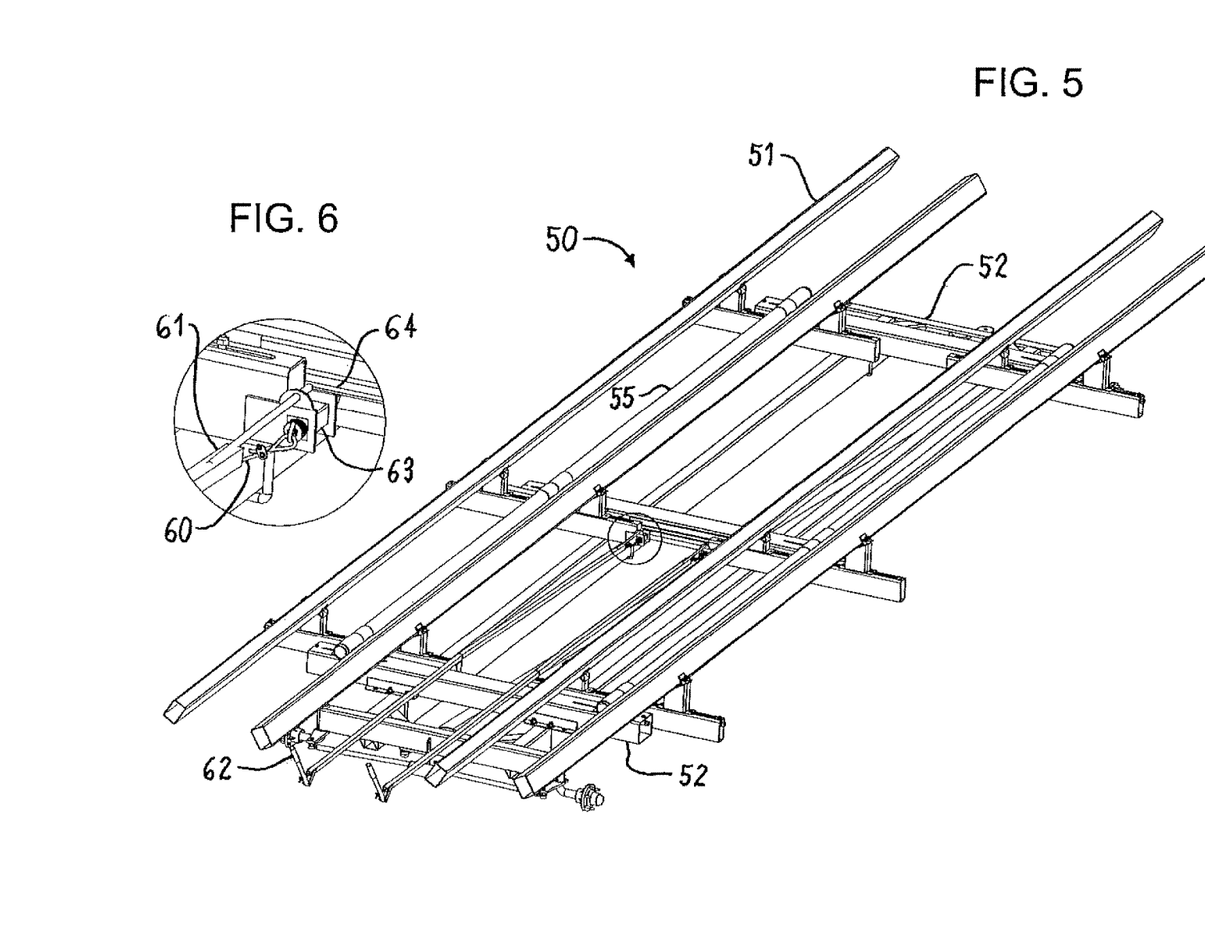
FIG. 5 is a perspective view thereof with the wheels omitted for clarity.
FIG. 6 is a detail perspective view of the latching mechanism thereof.

As previously mentioned, the cradle is balanced slightly toward the unloading position when unloaded and much more so when loaded. To prevent unloading until desired, a latch is included. The latch is best seen in FIGS. 6 and 9. A cable 60 runs within a sleeve 61 between a pivoting handle 62 at the front of the bale trailer and a spring loaded plunger 63. The plunger interacts with a catch 64. In the preferred embodiment, the catch is a ledge on the front side of the middle transverse member. When the cradle moves from the unloading position to the carry position, the plunger is pushed inwardly (against the spring action) as it passes over the catch. The plunger then returns to its extended position under the catch to secure the cradle in the carry position. The cradle is unloaded by pulling on the handle. The movement of the handle pulls the cable and moves the plunger, allowing the catch to be cleared.

Figure 10:
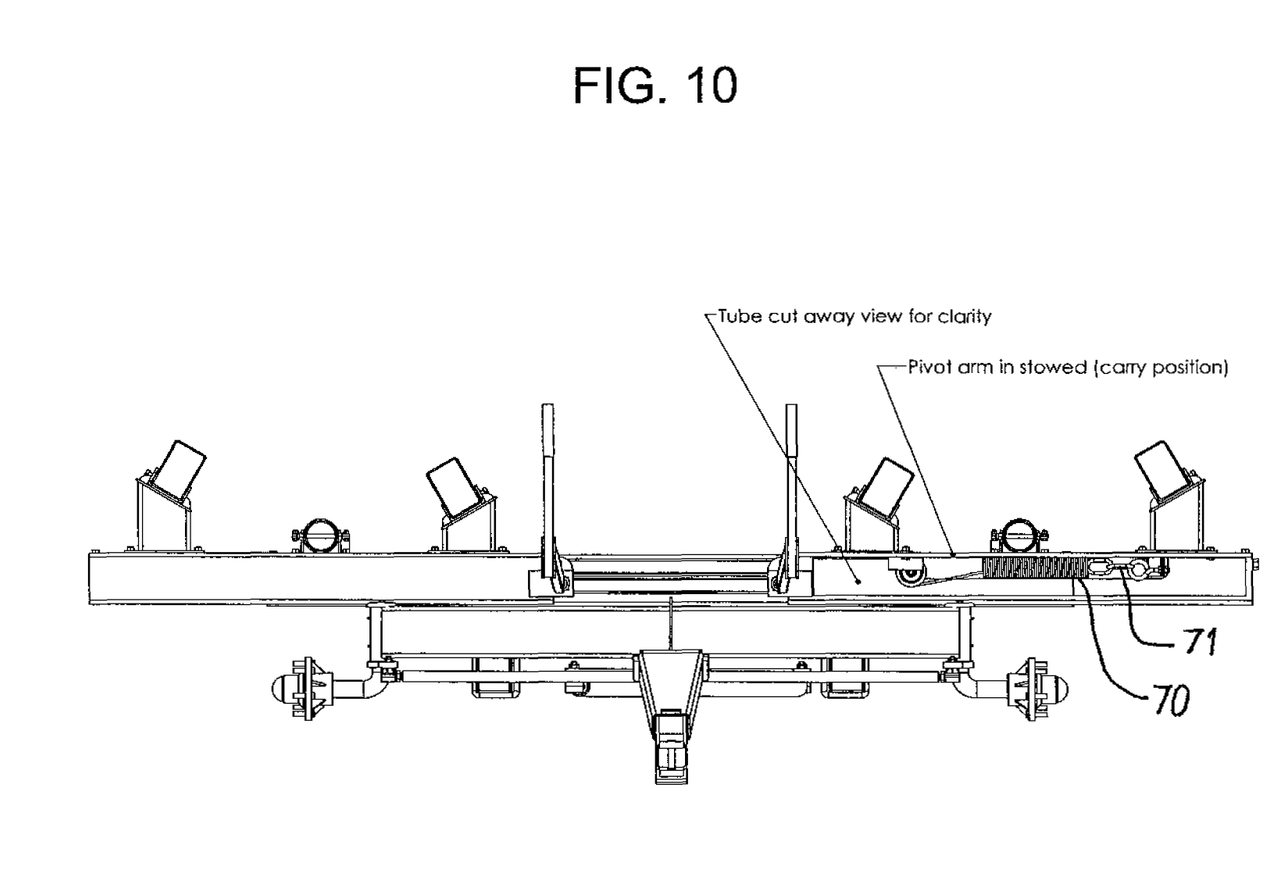
FIG. 10 is a front partial section elevation view showing the spring return mechanism in the carry position.
Figure 11:
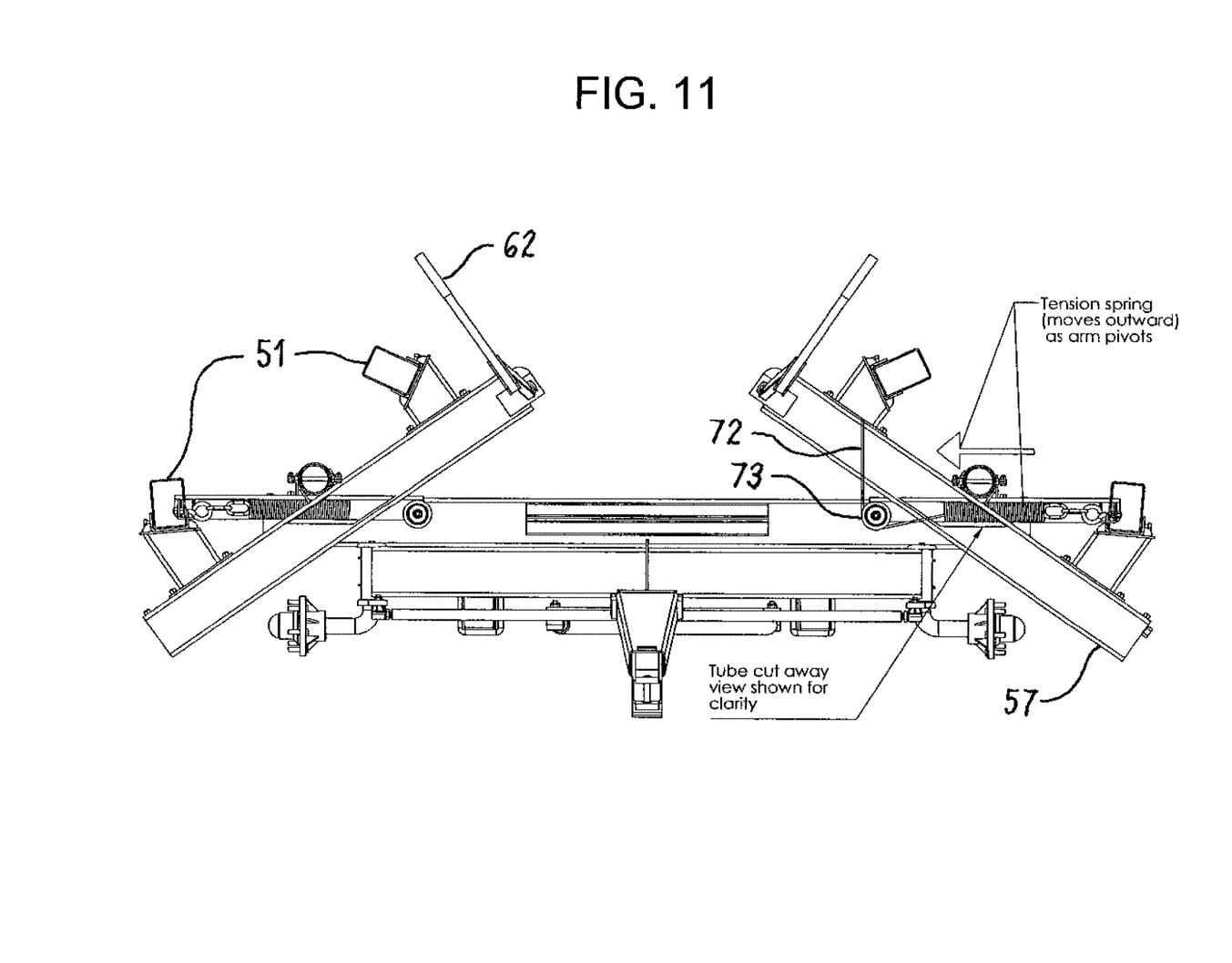
FIG. 11 is a front partial section elevation view showing the spring return mechanism in the unloading position.

After the bales are unloaded from the cradle, the cradle automatically returns to its carry position by the action of a helical extension spring 70, one on each side for each cradle. As best seen in FIGS. 10 and 11, the extension springs are oriented horizontally alongside the middle levers and middle transverse members. The outer end of the coil spring is attached to a ring linkage 71 that is, in turn, attached to the middle transverse member. The inner end of the spring is attached to a cable 72 that runs around pulley 73 before being attached to the inward end of the lever. In the carry position shown in FIG. 10, there is no tension on the spring. When the cradle unloads as shown in FIG. 11, the spring is stretched. The force of the spring pulls the cradle back into the carry position. As discussed above, the cradle latches when the cradle drops back into the carry position.

4. Use

The use of the bale trailer can now be considered. Before use, the bale trailer is adjusted for the type and size of the bales to be carried. To do so, two adjustments are made. The first adjustment is made by moving the fulcrum brackets on the transverse members to the position at which the bales can be accommodated at the minimum overall width. In other words, the distance between the bales in the left cradle and the bales in the right cradle is minimized. The second adjustment is made by moving the bar brackets on the levers to accommodate the shape and size of the bales.

The bale trailer is then loaded with bales. It is generally desirable to balance the weight from side to side. In other words, it is generally desirable to load half the bales on the left cradle and half the bales on the right cradle. As previously discussed, the cradles remain in the carry position during loading and transport due to the latches.

The bale trailer is then towed to the desired unloading position. The bales in a cradle are unloaded by pulling on the appropriate handle. As previously discussed, pulling on the handle releases the latch and allows the cradle to pivot outwardly to unload the bales. After unloading, the action of the extension spring returns the cradle back to the carry position where it is latched.

5. Features and Advantages

The bale trailer of this invention is easy to load and easy to unload. It requires no electrical power or hydraulic lines. It is easily adjustable to accommodate any common size of square or circular bales. The cradles return automatically to their carry position after unloading and latch automatically. The cradles form a separate unit that can be quickly and easily attached to a conventional trailer, either of the all wheel drive or gooseneck type.

I claim:

1. A bale trailer for transporting bales, the bale trailer comprising:
    (a) a frame having a length, a longitudinal axis, and a hitch;
    (b) a plurality of wheels supporting the frame; and
    (c) a pair of longitudinal and parallel bale cradles, one cradle on each side of the longitudinal axis of the frame, each cradle having a carry position and an unloading position, each cradle being balanced toward the unloading position, each cradle being retained in the carry position by a latch, and each cradle being returned to the carry position after unloading by a spring, each cradle comprising:
        (i) a plurality of transverse members supported by the frame, the transverse members having two movable fulcrum brackets connected on the upper surface near the outward ends thereof, each fulcrum bracket being connected to a rotatable threaded rod within the transverse member such that the distance between the fulcrum bracket and the outward end of the fixed transverse member is adjustable;
        (ii) a pair of spaced apart levers for each transverse member, each lever having an upper surface and a fixed fulcrum bracket, and each lever being pivotably connected to one of the movable fulcrum brackets on the transverse member;
        (iii) a pair of spaced apart movable bar brackets on the upper surface of each lever, each pair of bar brackets being connected to a rotatable threaded rod within the lever such that the distance between the pair of bar brackets on each lever is adjustable; and
        (iv) two parallel and spaced apart bale support bars connected to the bar brackets running about the length of the frame for supporting bales.

2. The bale trailer of claim 1 wherein the spring for each cradle comprises a helical extension spring, one end of which is connected to one of the pair of levers of the cradle and one end of which is connected to one of the plurality of transverse members of the cradle.

3. The bale trailer of claim 1 additionally comprising a connecting rod passing through the movable fulcrum brackets and the fixed fulcrum brackets on each cradle.

4. The bale trailer of claim 1 wherein the pair of movable bar brackets of each lever comprises an outer bar bracket with a height and an inner bar bracket with a height and wherein the height of the outer bar bracket is greater than the height of the inner bar bracket.

5. The bale trailer of claim 4 wherein the fixed fulcrum bracket of each lever is closer to the inner bar bracket than to the outer bar bracket.

* * * * *